United States Patent
Guo et al.

(10) Patent No.: US 8,483,425 B2
(45) Date of Patent: Jul. 9, 2013

(54) GEOSPATIAL INFORMATION CREATING SYSTEM AND GEOSPATIAL INFORMATION CREATING METHOD

(75) Inventors: Tao Guo, Higashimurayama (JP); Yoriko Kazama, Kokubunji (JP); Takashi Hino, Tokyo (JP); Yoshiaki Kagawa, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 424 days.

(21) Appl. No.: 12/850,816

(22) Filed: Aug. 5, 2010

(65) Prior Publication Data
US 2011/0075882 A1 Mar. 31, 2011

(30) Foreign Application Priority Data

Sep. 29, 2009 (JP) ................................. 2009-224204

(51) Int. Cl.
*G06K 9/00* (2006.01)

(52) U.S. Cl.
USPC ........... 382/100; 382/113; 382/164; 382/165; 382/173; 382/199; 382/291; 348/143; 348/144; 701/409; 701/523

(58) Field of Classification Search
USPC ................ 382/100, 103, 109, 113, 154, 162, 382/164, 165, 173, 174, 181, 190–195, 199, 382/201–204, 286, 291, 325; 348/143, 144; 701/400, 408, 409, 445–448, 450, 458, 461, 701/476, 479, 482, 514, 523
See application file for complete search history.

(56) References Cited

U.S. PATENT DOCUMENTS

| | | | | |
|---|---|---|---|---|
| 6,885,771 B2 * | 4/2005 | Takahashi | ...................... | 382/199 |
| 7,133,551 B2 * | 11/2006 | Chen et al. | .................... | 382/154 |
| 7,509,241 B2 * | 3/2009 | Guo et al. | ...................... | 382/165 |
| 7,752,018 B2 * | 7/2010 | Rahmes et al. | .................... | 703/2 |
| 8,209,152 B2 * | 6/2012 | Pershing | ........................... | 703/1 |
| 8,224,097 B2 * | 7/2012 | Matei et al. | .................... | 382/204 |
| 2004/0263514 A1 * | 12/2004 | Jin et al. | ........................ | 345/440 |
| 2007/0291994 A1 * | 12/2007 | Kelle et al. | .................... | 382/110 |

FOREIGN PATENT DOCUMENTS

| | | |
|---|---|---|
| JP | 2003-281207 | 10/2003 |
| JP | 2003-346144 | 12/2003 |
| JP | 2004-341422 | 12/2004 |

OTHER PUBLICATIONS

E. Gülch et al., New applications of semi-automatic building acquisition, Automatic Extraction of Man-Made Objects from Aerial and Space Images (III), Baltsavias et al. (eds), 2001 Swets & Zeitlinger, Lisse, ISBN 90 5809 252 6. pp. 103-114.
S.D. Mayunga et al., Semi-Automatic Building Extraction Utilizing Quickbird Imagery, In: Stilla U. Rottensteiner F, Hinz S (Eds) CMRT05, IAPRS, Aug. 29-30, 2005, vol. XXXVI, Part 3/W24, pp. 131-136.
JP Office Action for Japanese Application No. 2009-224204, dispatch date—Jan. 29, 2013.

* cited by examiner

*Primary Examiner* — Eric Rush
(74) *Attorney, Agent, or Firm* — Antonelli, Terry, Stout & Kraus, LLP.

(57) ABSTRACT

To be precisely extracted a house footprint. There is provided a geospatial information creating system for extracting a footprint of a house from an aerial photograph, comprising a processor for executing a program, a memory for storing data required for executing the program, and a storage unit for storing the aerial photograph. The processor detects edges of an image based on a characteristic quantity of neighboring pixels in the aerial photograph stored in the storage unit; extracts an orientation of the house by analyzing directions of the detected edges; and generates a polygon of an outline of the house by using linear lines of the extracted orientation of the house.

10 Claims, 19 Drawing Sheets

| SUCCESS/ FAILURE OF HOUSE FOOTPRINT EXTRACTION | PROCESSING CONTENTS |
| --- | --- |
| SUCCESSFUL | AREA OF EXTRACTED HOUSE FOOTPRINT IS MASKED TO PREVENT REPROCESSING |
| FAILED | AREA IS NOT MASKED FOR PERMITTING RESELECTION FOR PROCESSING |

GEOSPATIAL INFORMATION CREATING SYSTEM AND GEOSPATIAL INFORMATION CREATING METHOD

CLAIM OF PRIORITY

The present application claims priority from Japanese patent application JP 2009-224204 filed on Sep. 29, 2009, the content of which is hereby incorporated by reference into this application.

BACKGROUND OF THE INVENTION

This invention relates to a geospatial information creating system, and more particularly, to a technology of extracting a house footprint from aerial photograph and satellite imagery.

Geospatial information of houses (specifically house footprint) is very important for cadastral management. It is normally highly expensive to acquire such information through either conventional ground survey or manual digitization of aerial photograph. Extraction of house footprints from remote sensing image data (which includes, in addition to aerial photograph, satellite imagery and both of them are hereafter collectively referred to as "aerial photograph") is a very promising solution for updating geospatial information system (GIS) data. However, this task has remained a challenge in past decades due to its high complexity.

Though intensive efforts to extract house footprint have been conducted in past decades, there still is no automatic tool proposed for reliably extracting house footprint, as described in Gulch, E. and Muller, H. New applications of semi-automatic building acquisition. In Automatic Extraction of Man-Made Objects From Aerial and Space Images (III), Edited by Emmanuel P. Baltsavias, Armin Gruen, Luc Van Gool. ISBN: 90-5809-252-6. by A.A. BALKEMA PUBLISHERS, pp. 103-114. 2001. The conventional methods generally fall into two categories according to their primitive features used. One is based on edge-linking to link edges of houses along house boundaries. Another one is based on region growth algorithm to generate house regions by merging similar neighboring pixels.

However, both methods are very much sensitive to noise and incapable of dealing with complex cases such as weak edges and occlusion, therefore these methods are only applicable to very few practical cases. Currently, although semi-automatic systems are most efficient, they can hardly generate a house footprint map with correct geometric shape.

Mayunga, S. D., Zhang, Y. and Coleman, D. J. Semi-automatic building extraction utilizing Quickbird imagery. In Stilla, U. Rottensteiner, F. and Hinz, S. (Eds) CMRT05. IAPRS, Vol. XXXVI, Part 3/W24—Vienna, Austria, Aug. 29-30, 2005 describes a method based on dynamic contour model (for example, snake model), which deforms contour through minimizing an energy function, and generates an initial contour using "radial casting" algorithm. This method allows semi-automatic extraction of buildings from satellite imagery (for example, image taken by Quickbird). However, house footprints extracted according to "radial casting" algorithm are coarse and irregular, and hence the method can not solve the problem.

US 2004/0263514 A1 describes a semi-automatic method to extract house boundaries by linking the edges near the initial points given by user, but the method described in US 2004/0263514 A1 is insufficient to determine whether the edges really belong to target houses.

JP 2003-346144 A describes a method to use air-borne laser scanning data for segmenting house regions and then combining image data to extract house footprints. However, the method described in JP 2003-346144 A will very much increase the data cost by using laser scanning and also introduces uncertainty by combing data from different sources.

SUMMARY OF THE INVENTION

In extraction of house footprints from aerial photographs, detection of a house and extraction of the house are difficult.

The goal of house detection is to locate where a house is and to segment the house from other objects. In aerial photograph, houses are difficult to separate from its surrounding objects particularly in urban areas, where parking lots, grass land, bare fields, water bodies, road networks, and other man-made objects etc. exhibit very similar features to houses, such as shape, texture, spectral signature, etc. So far it has not been seen what kind of features or their combinations actually provide effective "general rules" for detecting and extracting houses.

The term "house extraction" is abused in the art. Many conventional methods and systems claim to extract houses, but actually just identify/find locations or coarse windows of houses. In this invention, house detection is explicitly defined to derive house footprint outlines and represent them geometrically.

It is very challenging to extract house boundaries with an acceptable geometric accuracy because houses have a wide variety of rooftop shapes and sub-structures. Moreover, assumable disturbance also comes from shadows, shadings, noises, and occlusions from other objects such as trees and other structures. The conventional "Box model" is a popular method which treats a house as a rectangular box, but it is a simple method for depicting house shapes and results in very coarse approximation of houses.

A geospatial information creating system for extracting a footprint of a house from an aerial photograph, comprising a processor for executing a program, a memory for storing data required for executing the program, and a storage unit for storing the aerial photograph. The processor detects edges of an image based on a characteristic quantity of neighboring pixels in the aerial photograph stored in the storage unit; extracts an orientation of the house by analyzing directions of the detected edges; and generates a polygon of an outline of the house by using linear lines of the extracted orientation of the house.

According to the representative embodiment of this invention, the house footprints can be precisely extracted.

BRIEF DESCRIPTION OF THE DRAWINGS

The present invention can be appreciated by the description which follows in conjunction with the following figures, wherein.

DETAILED DESCRIPTION OF THE PREFERRED EMBODIMENT

Configuration of System

Figure 1:
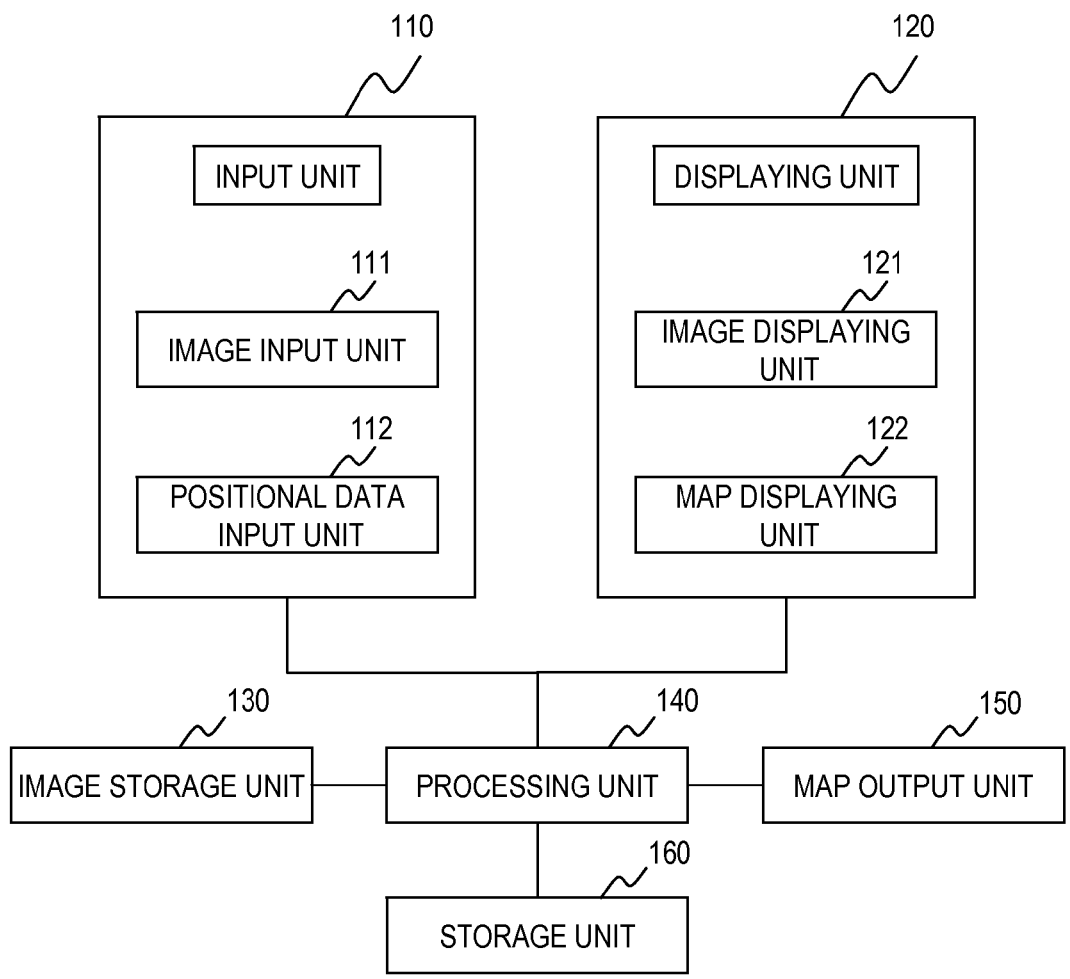
FIG. 1 is a block diagram illustrating structure of a geospatial information creating system according to an embodiment of this invention.

FIG. 1 is a block diagram illustrating structure of a geospatial information creating system according to an embodiment of this invention.

The geospatial information creating system according to this embodiment is a computer including an input unit 110, a displaying unit 120, an image storage unit 130, a processing unit 140, a map output unit 150, and a storage unit 160. The input unit 110, the displaying unit 120, the image storage unit 130, the map output unit 150, and the storage unit 160 are coupled to each other via the processing unit 140 (or coupled through a bus).

The input unit 110 comprises an image input unit 111, and a positional data input unit 112. The image input unit 111 is a device through which an image of houses is input, and is configured by an optical disk drive, a USB interface, and the like, for example. The positional data input unit 112 is a user interface through which an operator enters an instruction, and is configured by a pointing device such as a mouse, a keyboard, and the like.

The display unit 120 comprises an image displaying unit 121 and a map displaying unit 122. The image displaying unit 121 is a display device for displaying an image to be processed by the geospatial information creating system. The map displaying unit 122 is a display device for displaying a map generated by the geospatial information creating system. It should be noted that the image displaying unit 121 and the map displaying unit 122 may be configured by the same display device or different display devices.

The image storage unit 130 is a storage device for storing images to be processed by the geospatial information creating system, and is configured by a hard disk drive, a nonvolatile memory, and the like, for example. The processing unit 140 is a processing device (a processor), and, by executing programs, executes processing carried out in this system.

The map output unit 150 is a device for outputting maps generated by the geospatial information creating system, and is configured by a printer, plotter, and the like, for example. The storage unit 160 is a storage device for storing programs to be executed by the processing unit 140, map information, and a database of house footprints, and is configured by a hard disk drive, a nonvolatile memory, and the like, for example.

<Processing>

Figure 2:
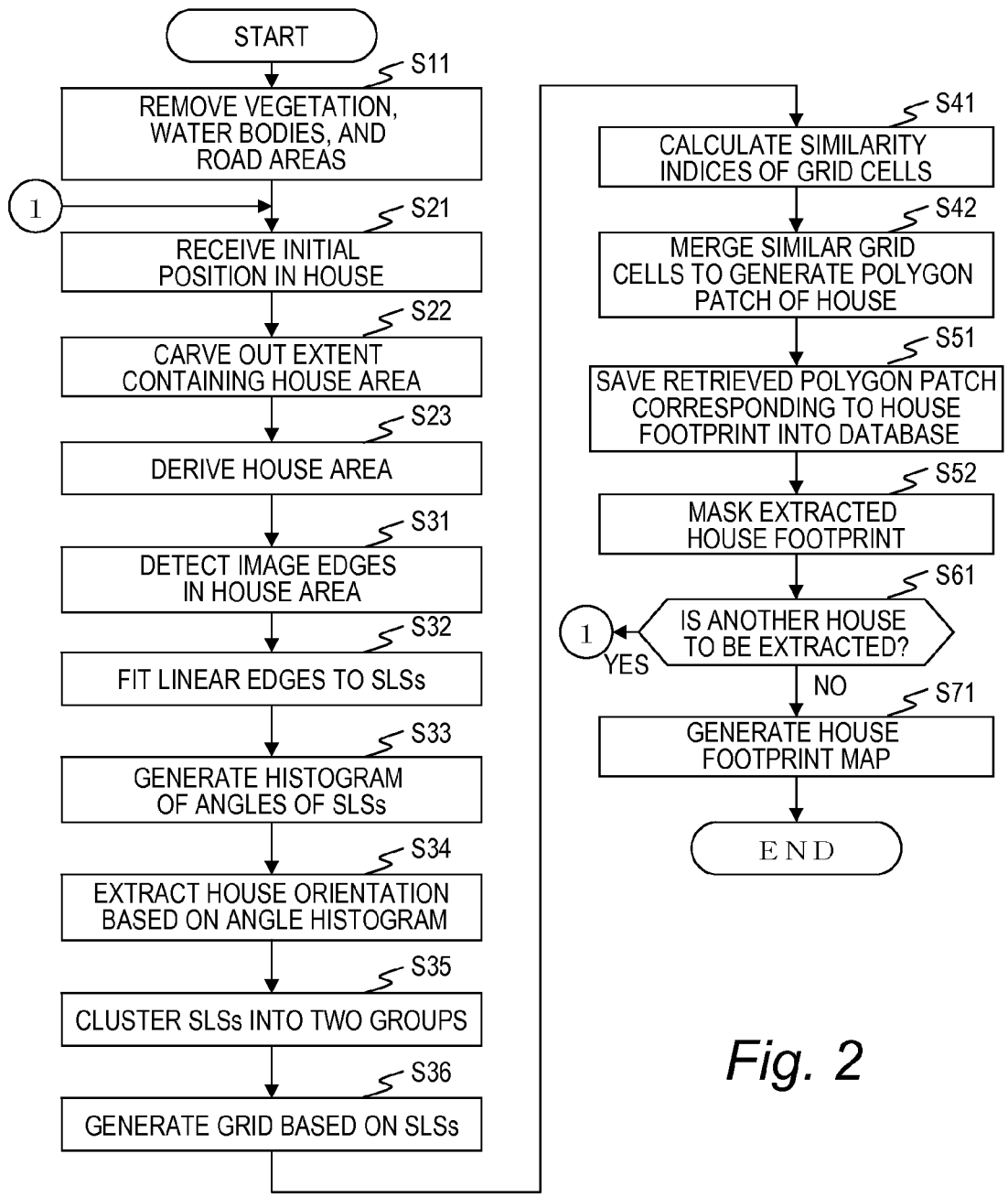
FIG. 2 is a flowchart illustrating overall house footprint extraction processing according to the embodiment of this invention.

FIG. 2 is a flowchart illustrating overall house footprint extraction processing according to the embodiment of this invention.

First, an image of houses (for example, an aerial photograph) received by the image input unit 111 is analyzed according to spectrum and geometric shapes for removing vegetation, water bodies, and roads from the image. Specifically, the vegetation such as trees, forests, and grasses emits light in a specific spectrum. Thus, areas having this specific spectrum can be distinguished from the photograph image. The spectrum of the vegetation can be analyzed by the well-known normalized difference vegetation index (NDVI) method using light in a plurality of channels such as visible (red) and infrared light. Moreover, the water body such as pools, ponds, lakes, canals, rivers, etc. has a near-zero NDVI value, and thus these areas are removed from the photograph image. On the other hand, road, bare-land and building/house etc. have an ambiguous spectrum. However, roads have long linear continuous geometrical features, and thus areas having these geometrical shapes are removed from the photogram image (S11).

FIGS. 3A to 3D describe the removal of landmarks based on the spectrum.

Figure 3A:
FIG. 3A is an image for describing removal of landmarks based on a spectrum according to the embodiment of this invention.
Figure 3B:
FIG. 3B is an image for describing removal of vegetation based on the spectrum according to the embodiment of this invention.
Figure 3C:
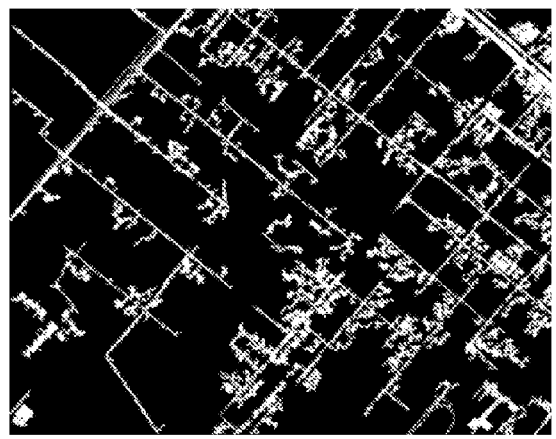
FIG. 3C is an image for describing removal of roads according to the embodiment of this invention.
Figures 3D, 4:
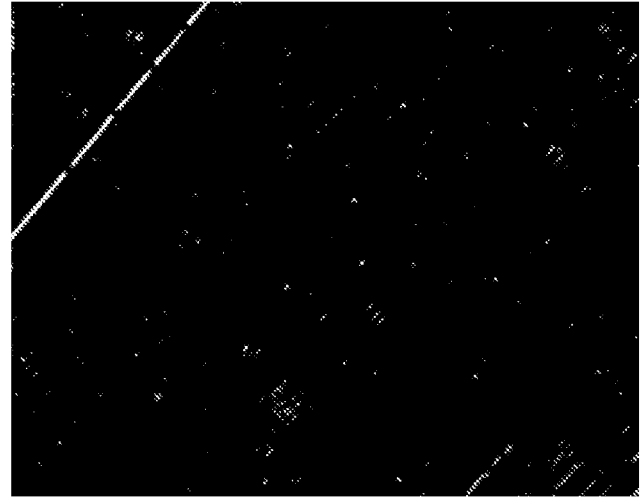
FIG. 3D is an image for describing removal of water bodies based on the spectrum according to the embodiment of this invention.
FIG. 4 is a table for describing processing carried out based on selection by a user according to the embodiment of this invention.

FIG. 3B illustrates vegetation segmented by the NDVI method, FIG. 3C illustrates roads segmented according to the geometrical shapes (long linear line), and FIG. 3D illustrates water bodies segmented by the NDVI method. In Step S11, by using, as a mask image, an image (FIG. 3A) obtained by combining the vegetation (FIG. 3B), the roads (FIG. 3C), and the water bodies (FIG. 3D), the vegetation, the roads, and the water bodies can be removed from the aerial photograph.

Thereafter, specification of an initial position (P(X, Y)) in a house whose footprint is to be extracted is received on the image through the positional data input unit 112 (S21). Next, an image in a predetermined range containing the specified initial position is carved out (S22). This carved-out area is a Region of Interest (ROI). The ROI confines a working space, and thus accelerates processing.

Thereafter, in the carved-out ROI, a house area is derived (S23). In Step S23, the derived house area may not exactly align with the house boundary, but preferably covers the target house and is close to the contour of the house. Details of the house area derivation processing are described later referring to FIG. 5.

Thereafter, image edges are detected in the derived house area (S31). For this edge detection, a well-known method may be used, and, for example, an existence of an edge is determined if a change in characteristic quantity (for example, brightness and color information) between neighboring pixels is larger than a predetermined threshold.

Thereafter, the extracted edges are fitted to Straight Line Segments (SLSs) (S32). Thereafter, a histogram of angles of the SLSs extracted in Step S32 is generated (S33). Details of the histogram generation processing are described later referring to FIG. 6.

Thereafter, a house orientation is extracted based on the angle histogram (S34). Walls and neighboring walls of a man-made house normally form right or near-right angles. Thus, the extracted SLSs exist in a pair of orthogonal directions in a Cartesian coordinate system. Thus, the direction which primary SLSs align with is defined as the orientation of house. Details of the angle histogram generation processing are described later referring to FIG. 8.

Thereafter, based on the deviation of the SLSs extracted in Step S32, the SLSs are clustered into two groups of the parallel and perpendicular directions (S35). Details of the SLS clustering processing are described later referring to FIG. 9.

Thereafter, based on the SLSs clustered into the two groups, grids are generated (S36). Details of this grid generation processing are described later referring to FIGS. 10 to 12.

Thereafter, spectra of grid cells divided by the respective grids are calculated, similarity indices of the grid cells are calculated based on the calculated spectra, and grid cells which are determined to be similar are marked (S41). Details of the similarity index calculation processing are described later referring to FIG. 14.

Thereafter, the similar grid cells are merged to generate rectilinear polygon patch corresponding to a house footprint surrounded by linear lines (S42). The polygon patch corresponding to a house footprint generated in this way is well matched with the shape of a house rooftop.

Thereafter, the outer boundary of the generated polygon patch is retrieved, and polygon patch surrounded by the retrieved outer boundary is saved into the database as a house footprint (S51). It should be noted that, in Step S51, a user interface may be provided to give a chance to determine whether the retrieved boundary is satisfactory or requires human's adjustment.

Thereafter, in the image, the extracted house footprint area is masked (S52). This mask prevents the masked area from being selected for further processing, thereby preventing the processing of deriving the house area from being carried out again.

FIG. 4 is a table for describing the processing carried out as a result of the selection of the user (S52). In the processing of S52, by referring to a determination table illustrated in FIG. 4, contents of the processing is determined.

When the extraction of a house footprint is successful, the area of the extracted house footprint is masked, and this house area is no longer subject to the selection, and is thus not extracted again.

On the other hand, when the extraction of a house footprint fails, the area is not masked, and hence can be selected again as an image area to which the processing of derivation of house area is applied again.

Thereafter, an input for whether or not another house is to be extracted is received (S61). When there is an input for extraction of another house from the user, the processing returns to Step S21, and the specification of an initial position is received.

On the other hand, when there is an input for finishing the extraction of a house from the user, by reading out the house footprint saved in the database in Step S51, and writing the read-out house footprint on a map, a map of house footprint is generated (FIG. 26, for example) (S71), and the house footprint extraction processing is finished.

Figure 5:
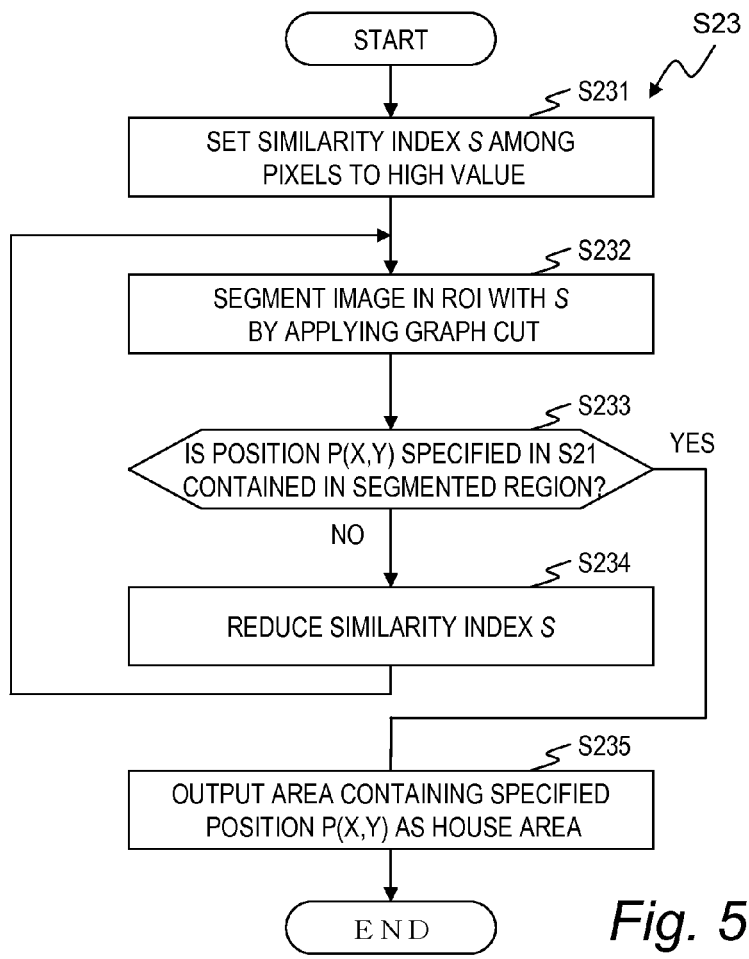
FIG. 5 is a flowchart illustrating, in detail, house extraction processing according to the embodiment of this invention.

FIG. 5 is a flowchart illustrating details of the house area derivation processing (S23) according to the embodiment of this invention.

First, a similarity index S indicating a correlation among pixels in the ROI is set to a high value (S231), and an image segmentation method (for example, Graph Cut) is applied with the similarity index S to segment the image in the ROI into regions (S232). Because the high value of S means the tight correlation among neighboring pixels, resulting in small but homogeneous segmented object regions.

Whether or not the specified position P(X, Y) in Step S21 is contained in a segmented object region is judged thereafter (S233).

When the point P(X, Y) is not contained in any segmented region, it means that an region containing the subject house has not yet been derived. Therefore, the similarity index S is reduced so that even when the relationship between neighboring pixels is weak, the pixels are determined to be similar (S234). Thereafter, the processing returns to Step S232, the processing of Steps S232 and S233 is repeated until an area containing the point P(X, Y) is segmented.

On the other hand, when the point P(X, Y) is contained in a segmented region, this region is significantly different from a periphery thereof, and is thus an area containing the point P(X,Y). As a result, the area containing the point P(X,Y) is output as a house area (S235). It should be noted that the periphery of the house area output in Step S235 may be extended by a predetermined length or area as a house area.

Figure 6:
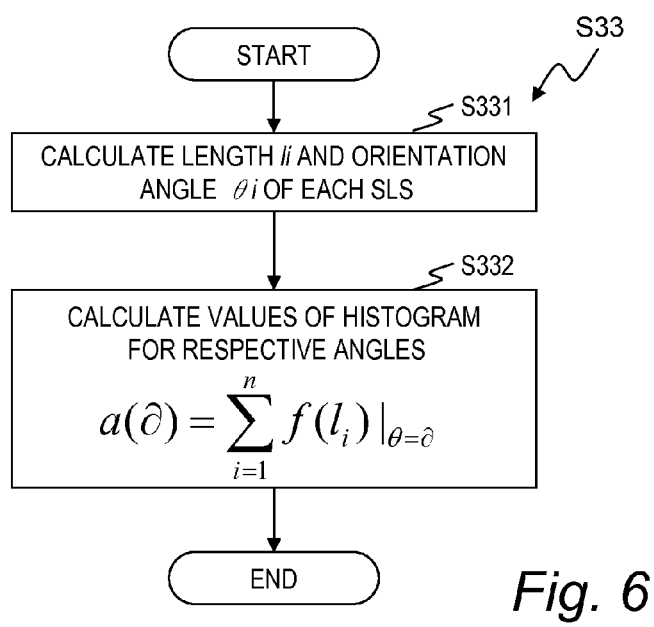
FIG. 6 is a flowchart illustrating, in detail, angle histogram generation processing according to the embodiment of this invention.

FIG. 6 is a flowchart illustrating details of the angle histogram generation processing (S33) according to the embodiment of this invention.

First, the length li and the orientation direction θi of each SLS are calculated (S331). The orientation direction θi is weighted with the SLS length li as a weight factor so as to determine a contribution value to the histogram by the SLS length li.

Next, an equation (1) is used to calculate values of the histogram for angles of all the SLSs (S332).

[Equation 1]

$$a(\partial) = \sum_{i=1}^{n} f(l_i) \bigg|_{\theta=\partial} \quad (1)$$

After the calculation of the histogram value of the angle is repeated for all the SLSs, the angle histogram generation processing (S33) is finished.

Figure 7A:
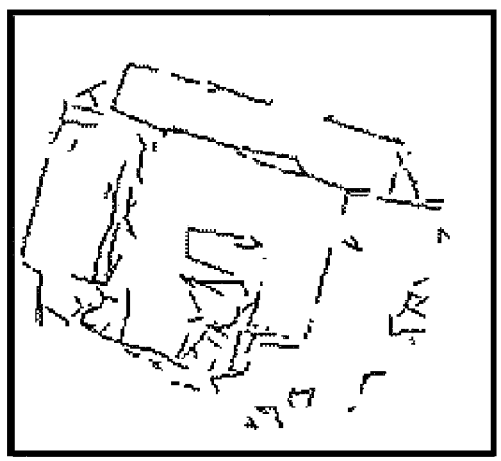
FIG. 7A is an image for describing the angle histogram generation processing according to the embodiment of this invention.
Figure 7B:
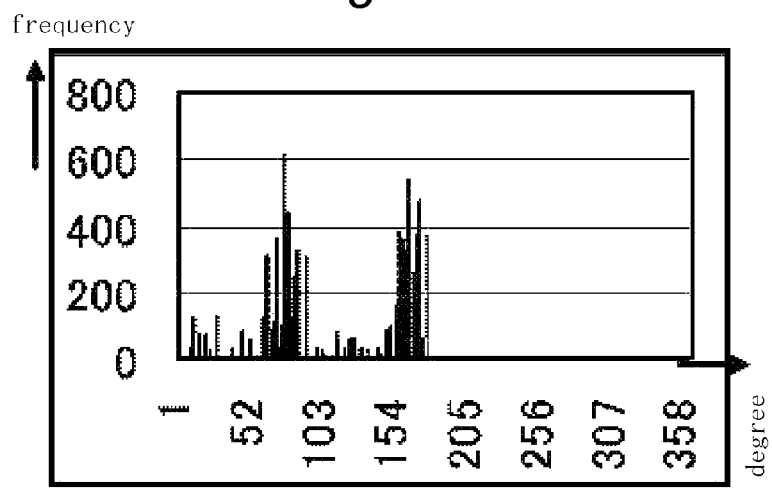
FIG. 7B is a histogram for describing the angle histogram generation processing according to the embodiment of this invention.
Figure 7C:
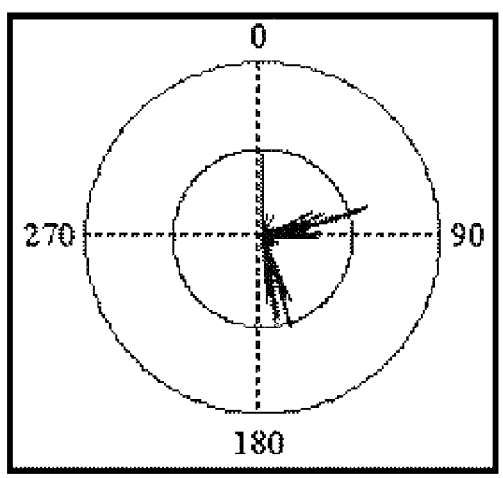
FIG. 7C is a histogram for describing the angle histogram generation processing according to the embodiment of this invention.

FIGS. 7A to 7C are histograms for describing a process of the angle histogram generation processing (S33).

Linear edges aligned to SLSs are represented as lines as illustrated in FIG. 7A.

As described before, walls and neighboring walls of a man-made house normally form right or near-right angles, and the footprint of the house is thus a rectangle. Moreover, buildings with other footprints are usually combination of rectangles. Through investigating the appearance of houses in aerial photographs, these right-angles form fairly obvious features.

The SLSs illustrated in FIG. 7A are represented as a histogram weighted by the length of the SLSs while the horizontal axis represents the angle thereof in FIG. 7B. Moreover, similarly, a circular histogram weighted by the length of the SLSs is illustrated in FIG. 7C.

According to FIGS. 7B and 7C, two peaks forming a right angle are apparent, and these two peaks most significantly characterize the orientation of the house. Next, one of the angles presenting the higher peak corresponds to the orientation of the house.

Figure 8:
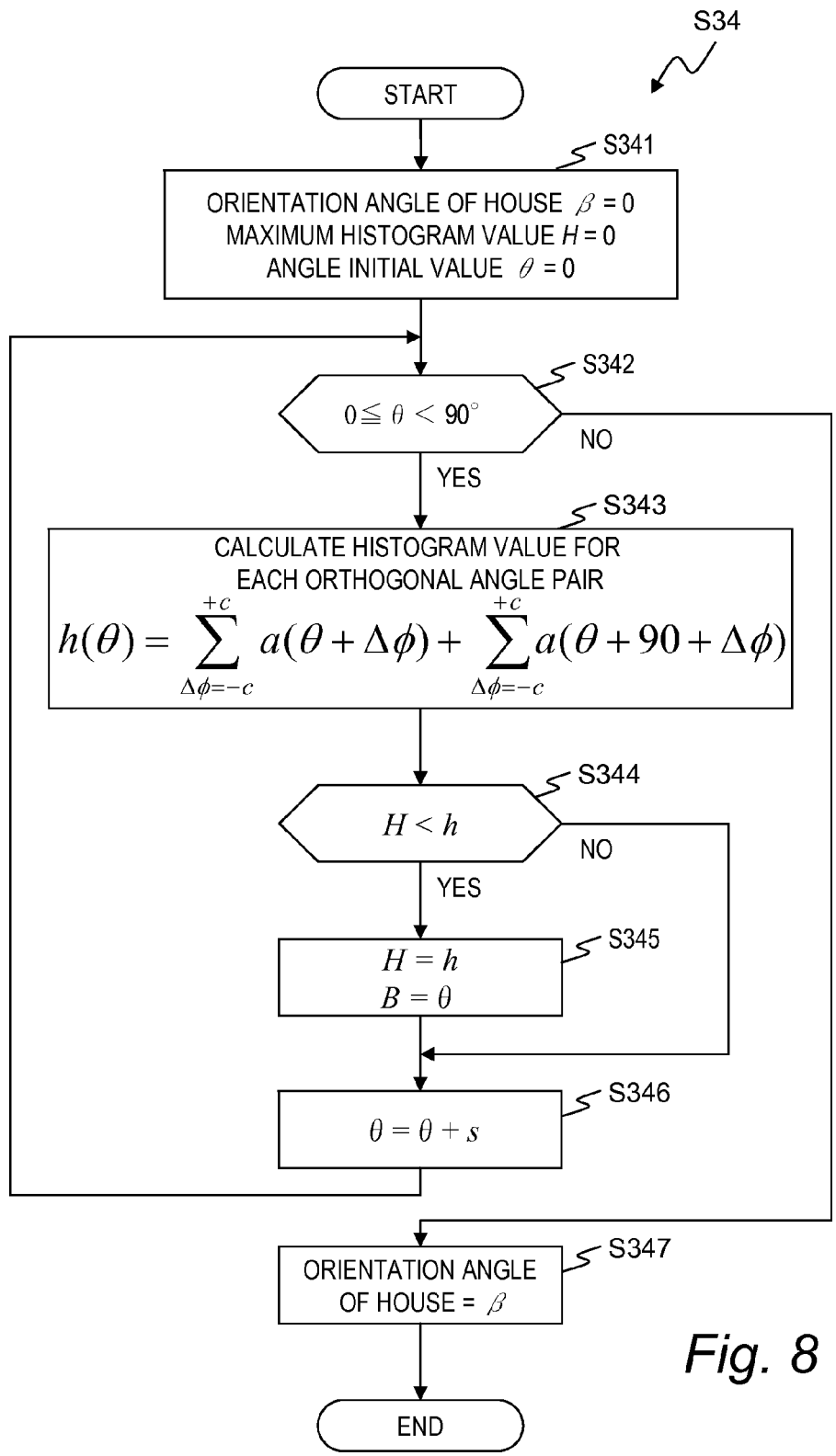
FIG. 8 is a flowchart illustrating, in detail, house orientation extraction processing according to the embodiment of this invention.

FIG. 8 is a flowchart illustrating details of the house orientation extraction processing (S34) according to the embodiment of this invention.

First, respective parameters for executing the house orientation extraction processing are initialized. Specifically, the orientation angle β is set to 0, the maximum histogram value H is set to 0, and a searching angle θ is set 0 (S341).

Thereafter, whether the searching angle θ is equal to or more than 0° and less than 90° is determined (S342). As a result, processing in a loop from Step S343 to Step S346 is repeated within a range of 0≦θ<90. On the other hand, when θ exceeds the range of 0≦θ<90 (namely θ is equal to or more than 90°), the processing proceeds to Step S347.

In Step S343, an equation (2) is used to calculate a histogram value h(θ) for each orthogonal angle pair. In this description, the orthogonal angle pair is a pair of angles separated +90 degrees or −90 degrees each other.

[Equation 2]

$$h(\theta) = \sum_{\Delta\phi=-c}^{+c} a(\theta + \Delta\phi) + \sum_{\Delta\phi=-c}^{+c} a(\theta + 90 + \Delta\phi) \quad (2)$$

In the equation (2), histogram values are summed in a range from an angle θ−c to an angle θ+c. This c represents a neighborhood of the angle θ, and the half of a step s of the searching angle described later in Step S346 is preferably used. Further, in the equation (2), to the histogram values in the neighborhood of the angle θ, histogram values in the neighborhood of the angle θ+90° are also added. This is based on the fact that neighboring walls of a house are orthogonal to each other.

After the histogram value h(θ) is calculated, h(θ) and the maximum histogram value H are compared with each other (S344). As a result, when h(θ) is larger than H, the angle is closer to the house orientation angle, and hence, in order to update the maximum histogram value H, h(θ) is saved to H, and the angle θ which gives h(θ) is set to the orientation angle β (S345). On the other hand, when h(θ) is not larger than H, it is not necessary to update the maximum histogram value H, and hence the calculated h(θ) is neglected, and the processing proceeds to Step S346.

In Step S346, a new θ is defined by adding the increment value s to the angle θ, the processing returns to Step S342, and h(θ) is calculated repeatedly in the range of 0≦θ<90.

In Step S347, the orientation angle β is set to the house orientation angle.

Figure 9:
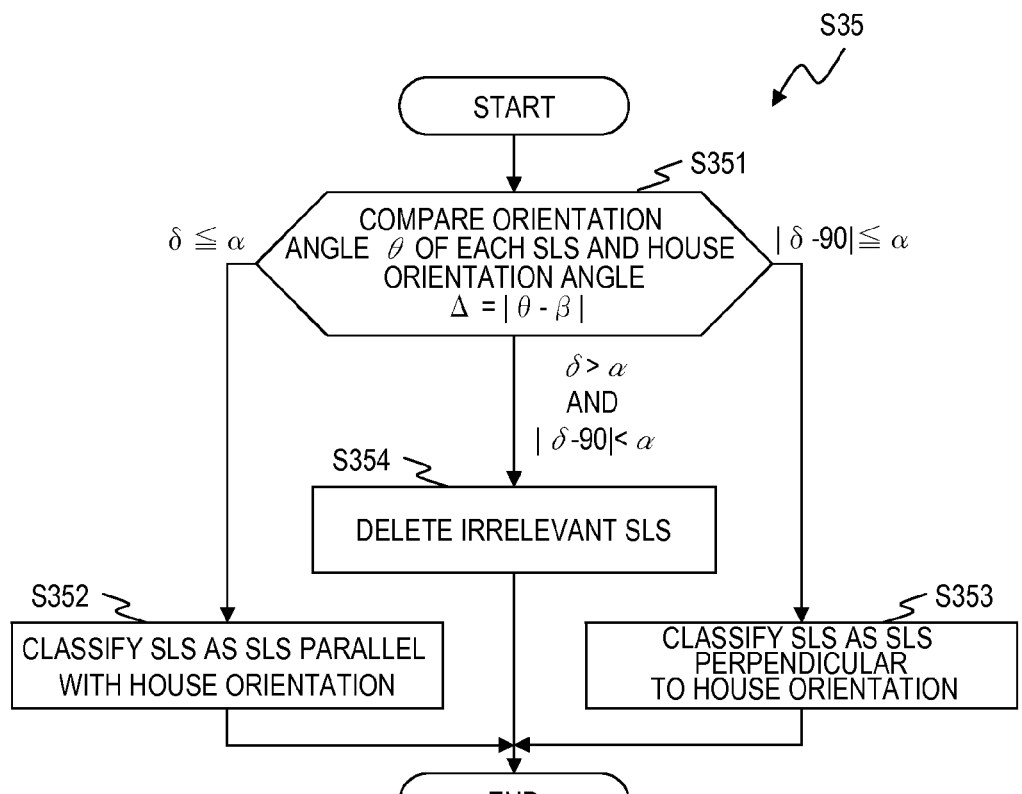
FIG. 9 is a flowchart illustrating, in detail, Straight Line Segment (SLS) classification processing according to the embodiment of this invention.

FIG. 9 is a flowchart illustrating details of the SLS clustering processing (S35) according to the embodiment of this invention.

In order to compare the orientation angle θ of the each SLS and the house orientation angle β, a deviation δ=|θ−β| is calculated, and the calculated deviation δ and a predetermined value α are compared with each other (S351). The value α is a permissible deviation of the orientation angle of the SLS.

As a result, when δ≦α, the orientation angle θ of the SLS is close to the orientation angle β of the house, and thus the SLS is classified as an SLS parallel with the house orientation (S352). On the other hand, when |δ−90|≦α, the orientation angle θ of the SLS is approximately perpendicular to the orientation angle β of the house, and thus the SLS is classified as an SLS perpendicular to the house orientation (S353). Further, when δ>α and |δ−90|>α, this SLS is irrelevant to contours of the house, and is thus deleted (S354).

Next, by repeating the processing in Steps S351 to S354, all the SLSs are classified.

Figure 10:
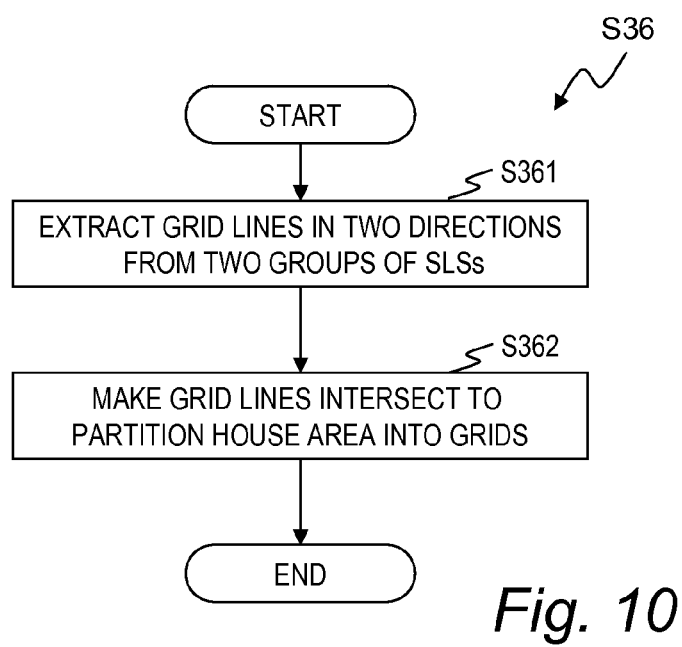
FIG. 10 is a flowchart illustrating, in detail, grid generation processing according to the embodiment of this invention.

FIG. 10 is a flowchart illustrating details of the grid generation processing (S36) according to the embodiment of this invention.

First, from the each clustered SLS group in which the groups are clustered into two classes, grid lines in the two directions are extracted (S361). Details of the grid line extraction processing are described later referring to FIG. 11.

Thereafter, the extracted grid lines are made to intersect to partition the house area into grids (S362).

Figure 11:
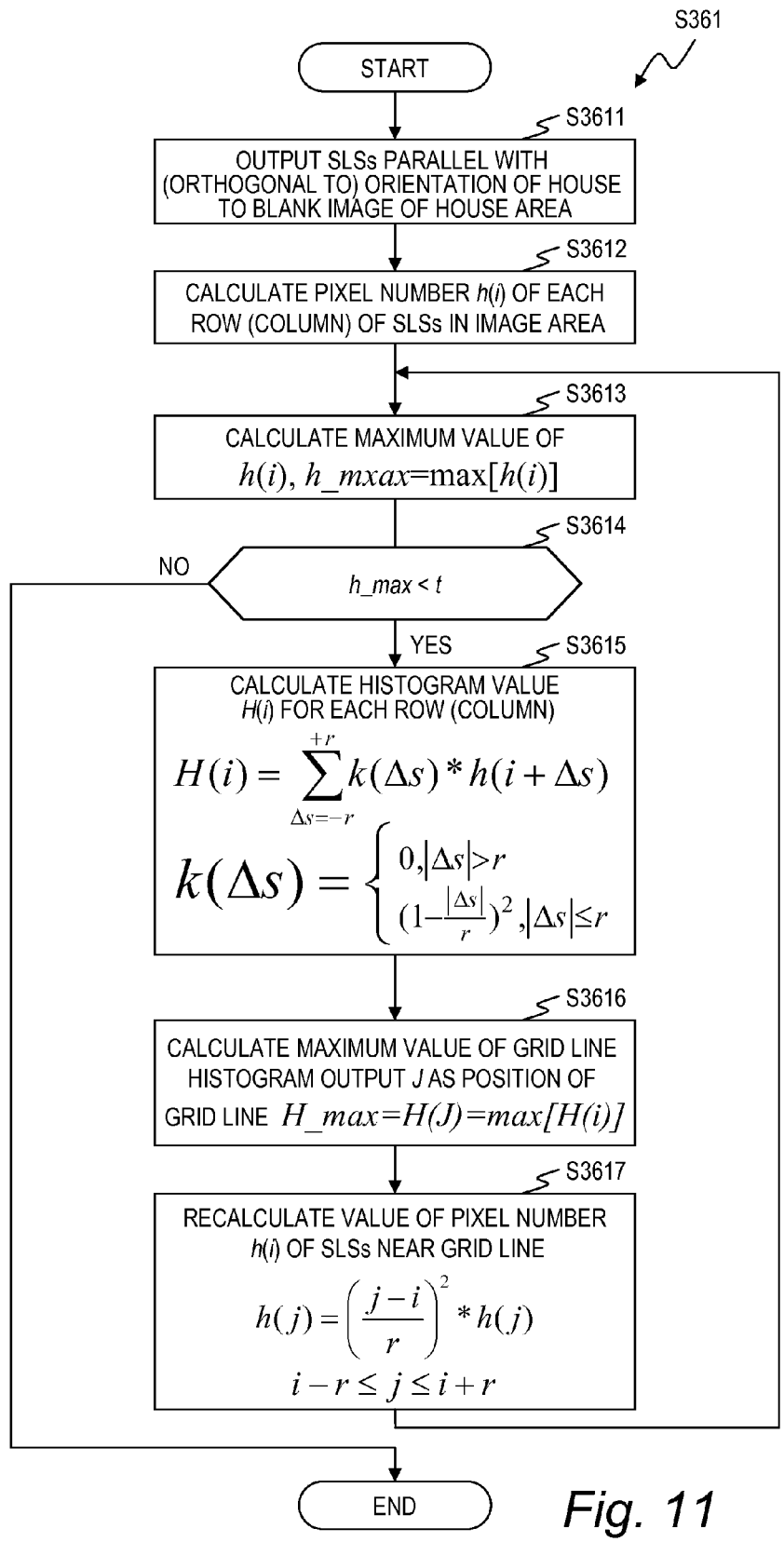
FIG. 11 is a flowchart illustrating, in detail, grid line extraction processing according to the embodiment of this invention.

FIG. 11 is a flowchart illustrating the details of the grid line extraction processing (S361) according to the embodiment of this invention, and, to each of the directions of the two orthogonal coordinate axes, the grid line extraction processing is applied.

First, a blank image of the house area is prepared, and, to this blank image, SLSs parallel with the orientation of the house is output (S3611). Thereafter, for an i row (or column)

of the respective SLSs in the image area, the number h(i) of pixels is calculated (S3612). This pixel number h(i) represents the length of the each SLS.

Thereafter, the maximum value max[h(i)] of h(i) is calculated, and is set to h_max. Specifically, h(i) and h_max are compared, and when h(i) is equal to or more than h_max, a significant grid line is present near the i row, and hence h(i) is set to h_max (S3613).

Thereafter, h_max and t are compared (S3614). t is a predetermined threshold, and is used to determine whether an SLS can be a major grid line.

When h_max is less than t, the grid line extraction processing is finished, and a predetermined value (for example, value twice as large as r used in Step S3617) is added to i, and a next SLS is processed. In this description, a parameter i is sequential number for specifying line or row. A parameter r determines a buffer range (predetermined neighboring range). For example, i specifies nth line if i=n. Further, the buffer range of 10th line is n=7 to 13 if i=10 and r=3.

On the other hand, when h_max is equal to or more than t, the SLS is a major grid line, and hence, according to an equation (3), a histogram value H(i) for h(i) of the i row (or column) in the buffer range is calculated (S3615).

[Equation 3]

$$H(i) = \sum_{\Delta s=-r}^{+r} k(\Delta s) * h(i+\Delta s) \quad (3)$$

$$k(\Delta s) = \begin{cases} 0, & |\Delta s| > r \\ \left(1 - \frac{|\Delta s|}{r}\right)^2, & |\Delta s| \le r \end{cases}$$

The precise position of the grid line is determined at row J where H(J) is equal to max[H(i)], and thus, the maximum value of the grid line histogram is calculated according to an equation (4). J which gives the calculated H_max is at the highest in density of SLS, the value of J is output as the position of the grid line (S3616).

[Equation 4]

$$H\_max = H(J) = max[H(i)] \quad (4)$$

Figure 12A:
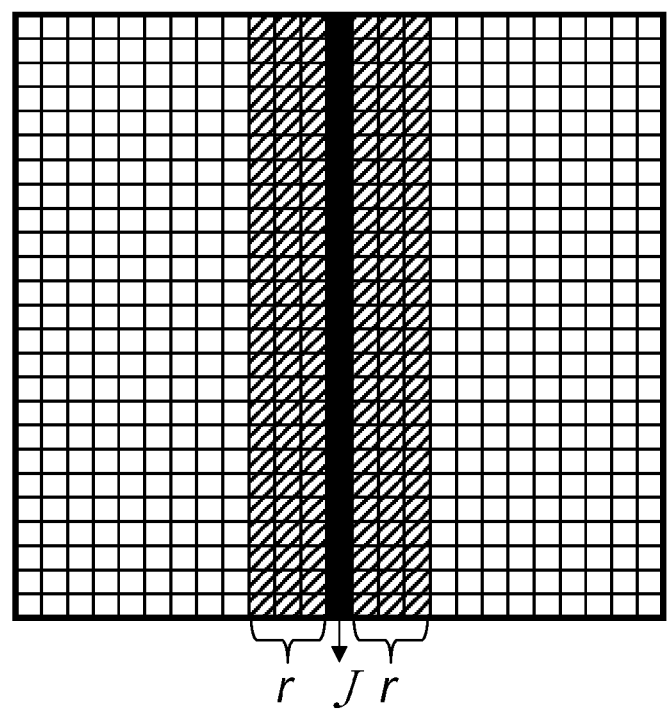
FIGS. 12A and 12B are images for describing a deviation r from a grid line according to the embodiment of this invention.
Figure 12B:
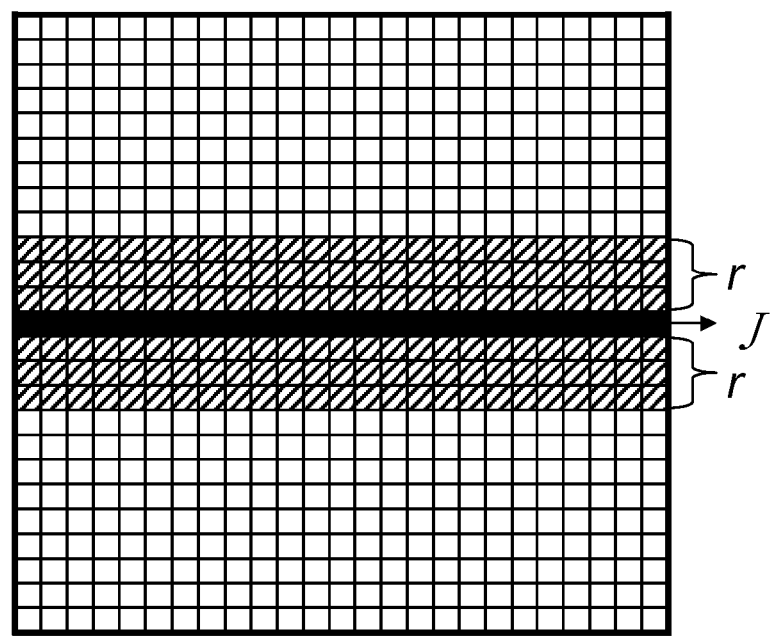

When the grid line is output at the J row, nearby SLSs of the J row have already contributed to the histogram of the grid line of the J row and their influence to other grid lines should be reduced correspondingly. Therefore the values of pixel number h(i) of the SLSs near the grid line are recalculated according to an equation (5) (S3617). On this occasion, as illustrated in FIGS. 12A and 12B, r represents a deviation from a grid line, and SLSs within the range of ±r from the grid line is merged to the grid line of J row. This calculation reduces the value h(i) inversely to the distance to the J row.

[Equation 5]

$$h(j) = \left(\frac{j-i}{r}\right)^2 * h(j) \quad (5)$$

$$i - r \le j \le i + r$$

Thereafter, the processing returns to Step S3616, the predetermined value (for example, value twice as large as r used in Step S3617) is added to and a next SLS is processed. In this description, a parameter i is sequential number for specifying line or row.

Figure 13A:
FIGS. 13A and 13B are images for describing classification of SLSs according to the embodiment of this invention.
Figure 13B:
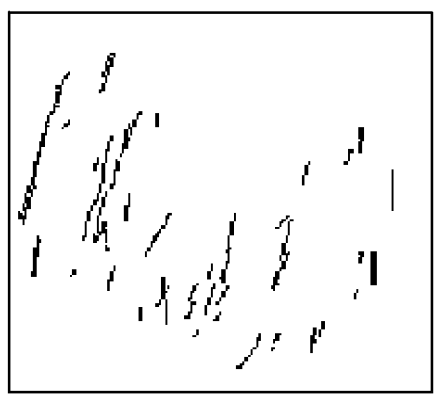
Figure 13C:
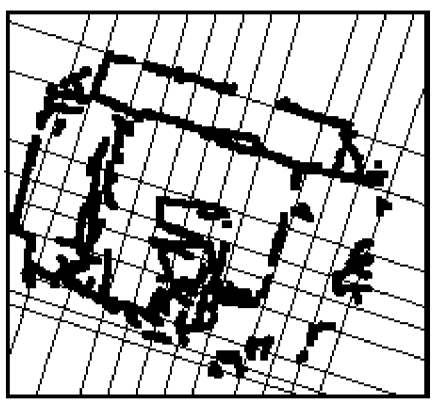
FIG. 13C is an image for describing generation of grids according to the embodiment of this invention.

FIGS. 13A to 13C are images for describing the process in which SLSs are classified, and a house area is partitioned into grids.

Of SLSs parallel with and perpendicular to the house orientation classified from the linear edges (SLSs), illustrated in FIG. 7A, FIG. 13A illustrates the parallel SLSs and FIG. 13B illustrates the orthogonal SLSs. Thereafter, as illustrated in FIG. 13C, the grid lines perpendicular to and parallel with the house orientation are determined.

Figure 14:
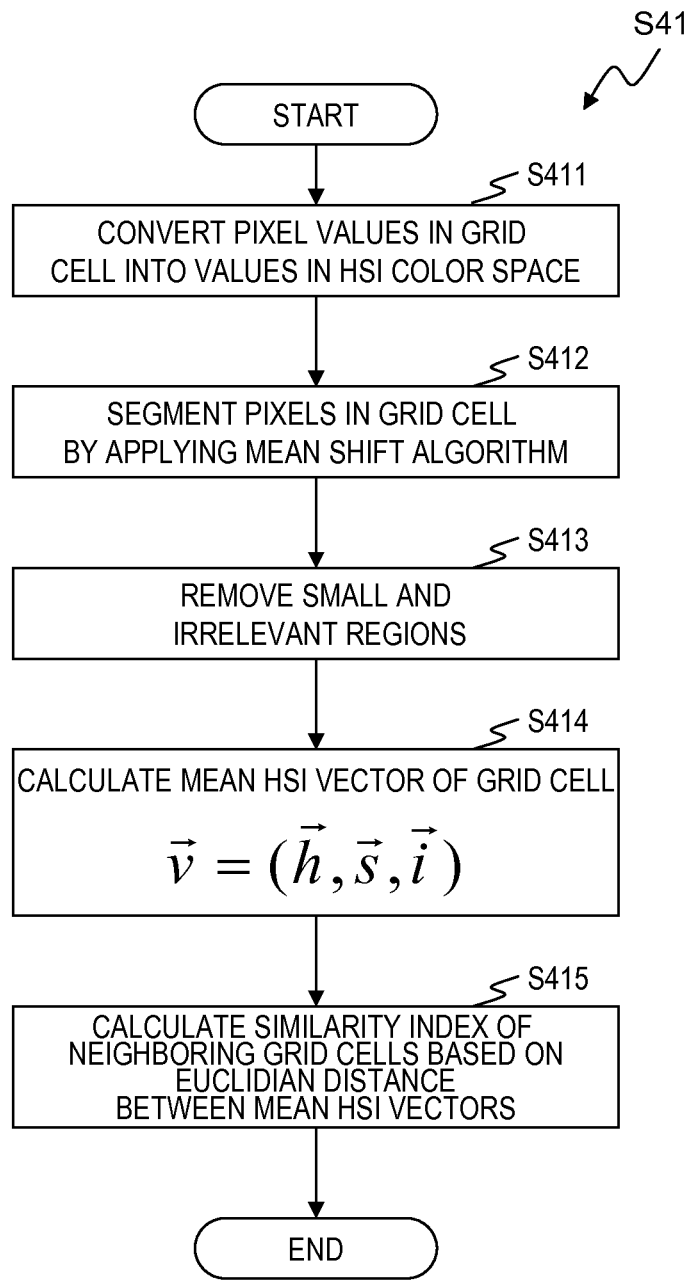
FIG. 14 is a flowchart illustrating processing for calculating a similarity index of grid cells according to the embodiment of this invention.

FIG. 14 is a flowchart illustrating the processing of calculating similarity indices of grid cells (S41) according to the embodiment of this invention.

First, RGB values of pixels in a grid cell are converted into values in the HSI color space (S411). The conversion between the color spaces is carried out because the HSI color space is close to a perceived color space, and thus, the perceived color difference is well associated with the Euclidean distance in the HSI color space.

Thereafter, the mean shift (MS) algorithm is applied to segment pixels in each grid cell image (S412). The MS algorithm is a very versatile procedure for image segmentation and it can significantly reduce the number of basic image clusters.

Thereafter, of the segmented regions, small regions (namely fragmental and noise like regions) are removed (S413).

Thereafter, according to an equation (6), a mean vector of the grid cell is calculated as the similarity index of the grid cell (S414).

[Equation 6]

$$\vec{v} = (\vec{h}, \vec{s}, \vec{i}) \quad (6)$$

Next, by repeating the processing in Steps S411 to S414, the mean vectors are calculated for all the grid cells.

Thereafter, based on the Euclidean distance between calculated mean vectors, the similarity index for neighboring grid cells is calculated (S415).

A description is now given of how an aerial photography changes according to the processing of this invention.

The embodiment of this invention can efficiently extract house footprints from aerial photographs and satellite imagery. Moreover, the method according to this embodiment can extract a house footprint without depending on any other auxiliary data.

Moreover, not only identifying the location of a house, the method can extract the geometric shape of a house footprint based on the rectilinear house model. This enables the processing to significantly simplify the complexity of house footprints with little loss of geometric accuracy.

Figure 15:
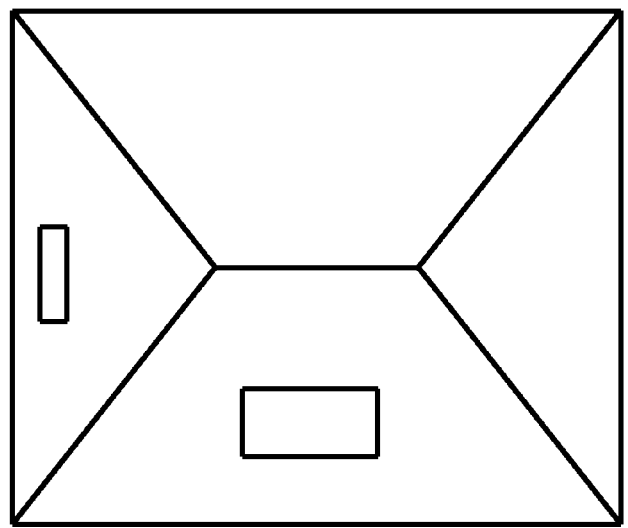
FIG. 15 illustrates a house rooftop processed by the geospatial information creating system according to the embodiment of this invention.
Figure 16:
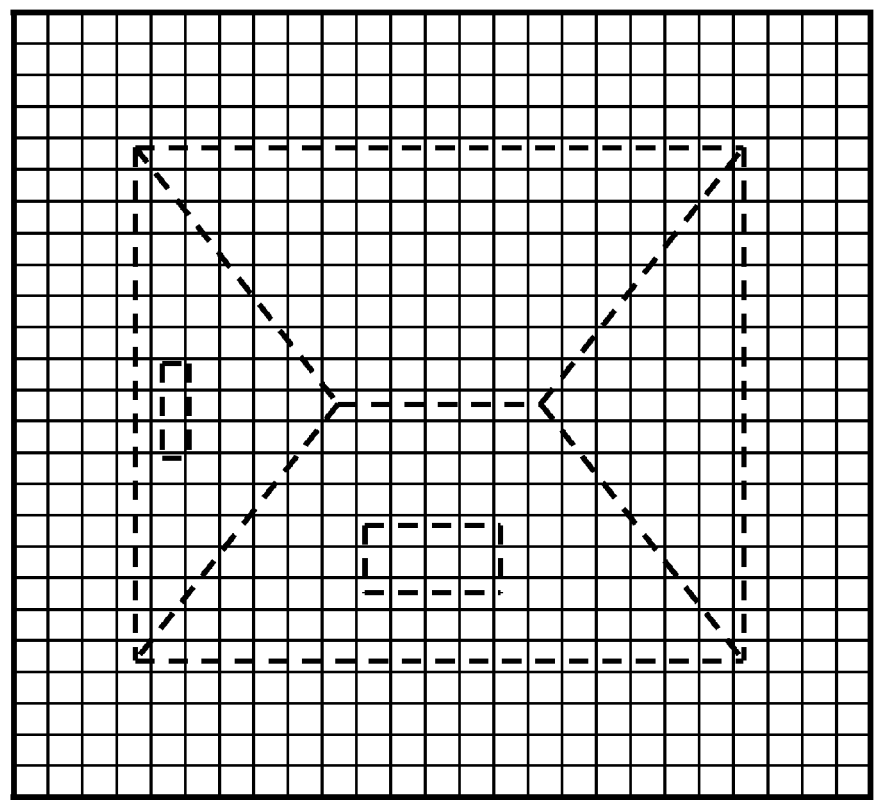
FIG. 16 illustrates an image of the house rooftop processed by the geospatial information creating system according to the embodiment of this invention.

As illustrated in FIG. 15, a rooftop of a house normally forms ridges, and thus appears complicated. The image of a house rooftop is even blurred due to the illustration condition and the limits of imaging sensor. As illustrated in FIG. 16, the image of the house rooftop is drawn on predetermined grids.

Figure 17:
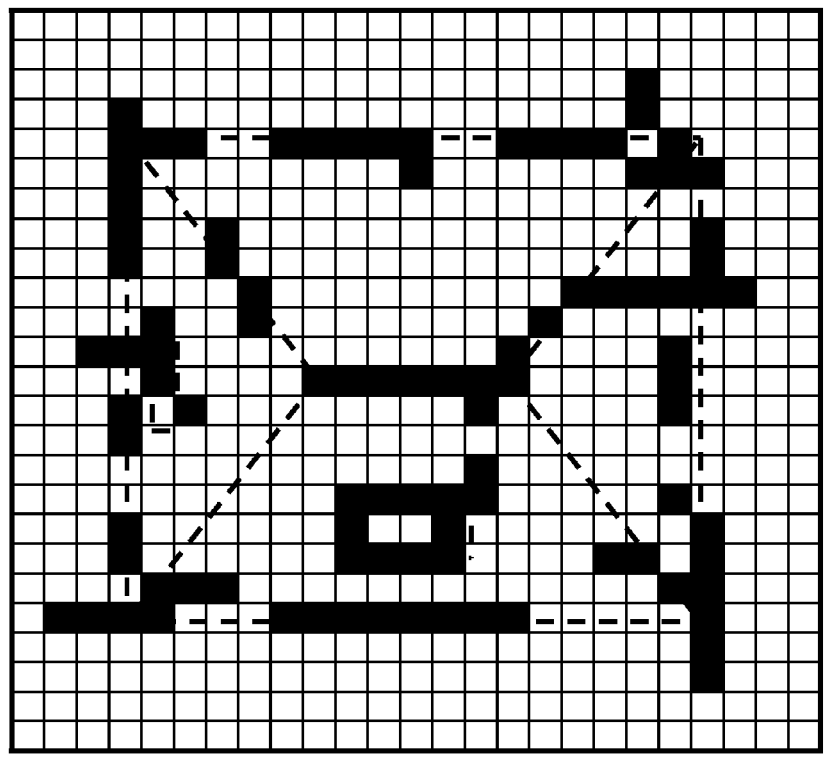
FIG. 17 illustrates linear edges of the house rooftop extracted by the geospatial information creating system according to the embodiment of this invention.

As illustrated in FIG. 17, the edges of the image extracted in Step S31 align with the physical boundary of the house. Moreover, noises in the image are also detected as edges.

Figure 18:
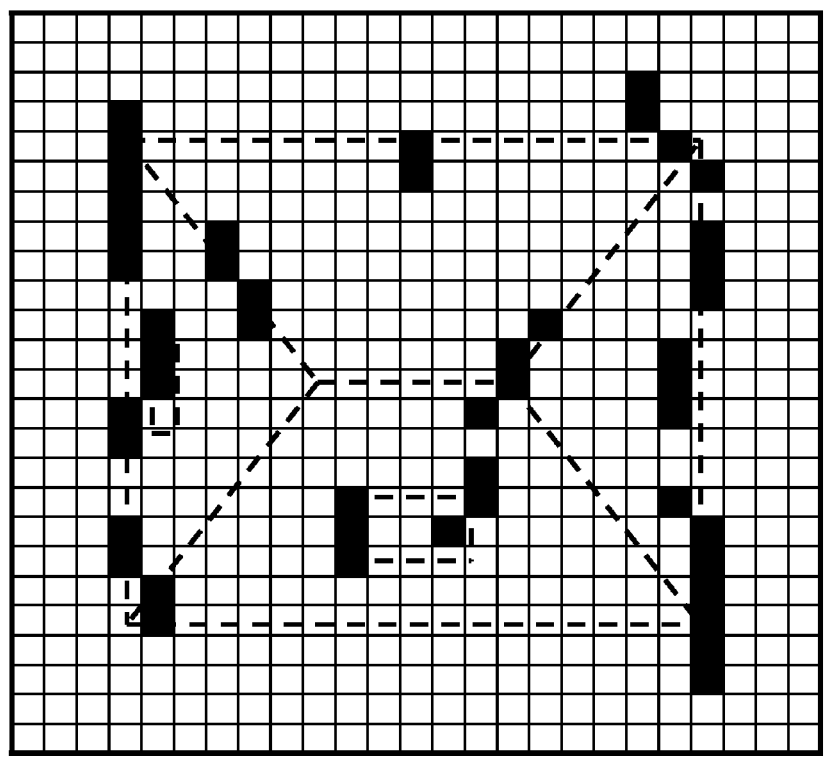
FIG. 18 illustrates SLSs classified into a class perpendicular to a house orientation by the geospatial information creating system according to the embodiment of this invention.
Figure 20:
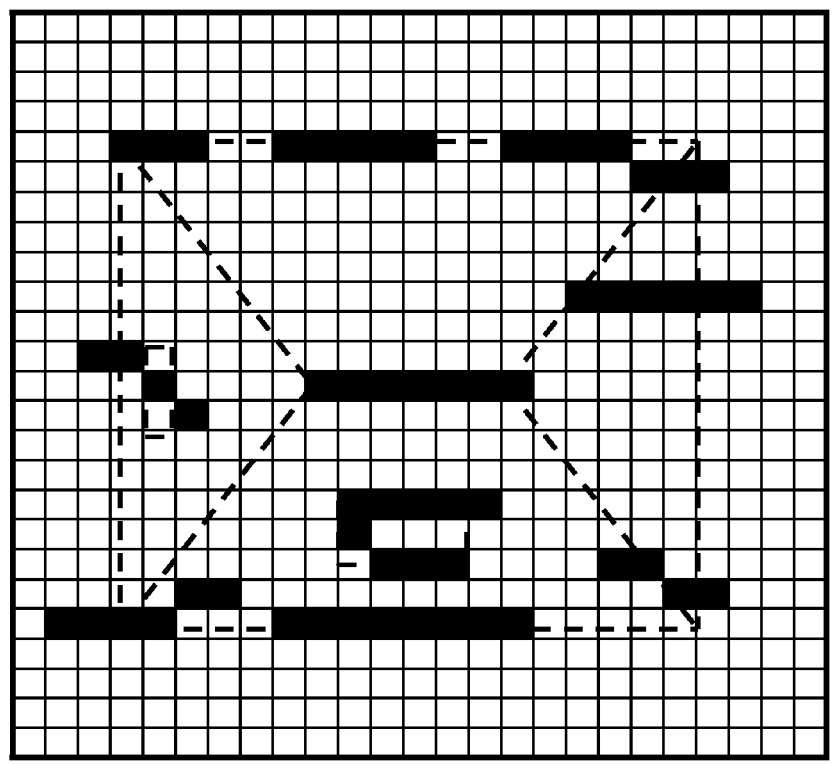
FIG. 20 illustrates SLSs classified into a class parallel with the house orientation by the geospatial information creating system according to the embodiment of this invention.

As described above, the detected linear edges are thereafter fitted into the SLSs (S32). Thereafter, a histogram is generated in Step S33. Next, a house orientation is extracted based on the angle histogram of SLSs (S34). The SLSs are clustered into two groups as illustrated in FIGS. 18 and 20, which are approximately parallel with and perpendicular to the orientation of the house, respectively.

Figure 19:
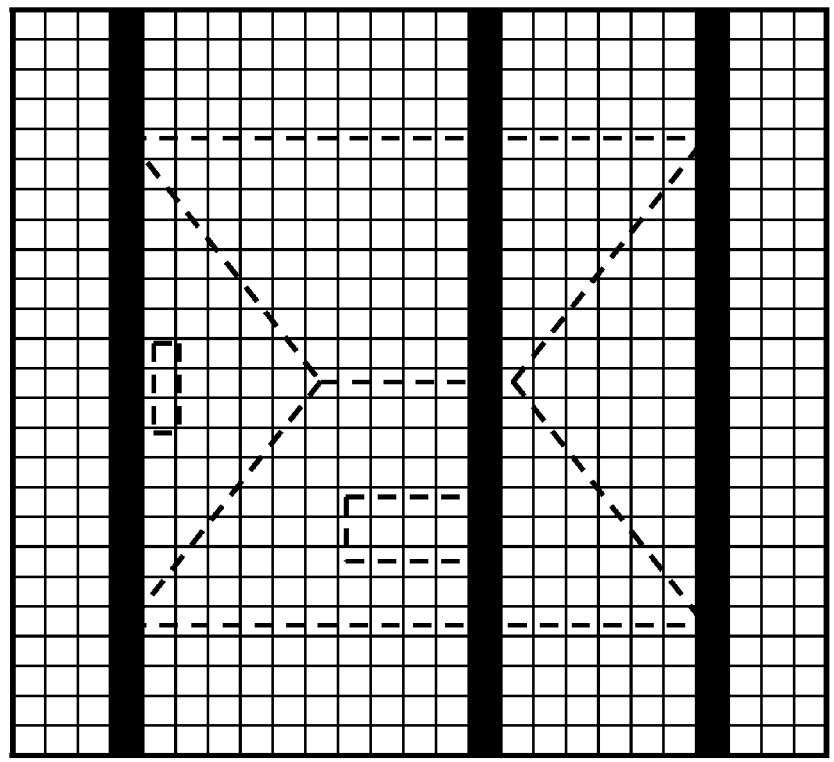
FIG. 19 illustrates grid lines extracted by the geospatial information creating system according to the embodiment of this invention.
Figure 21:
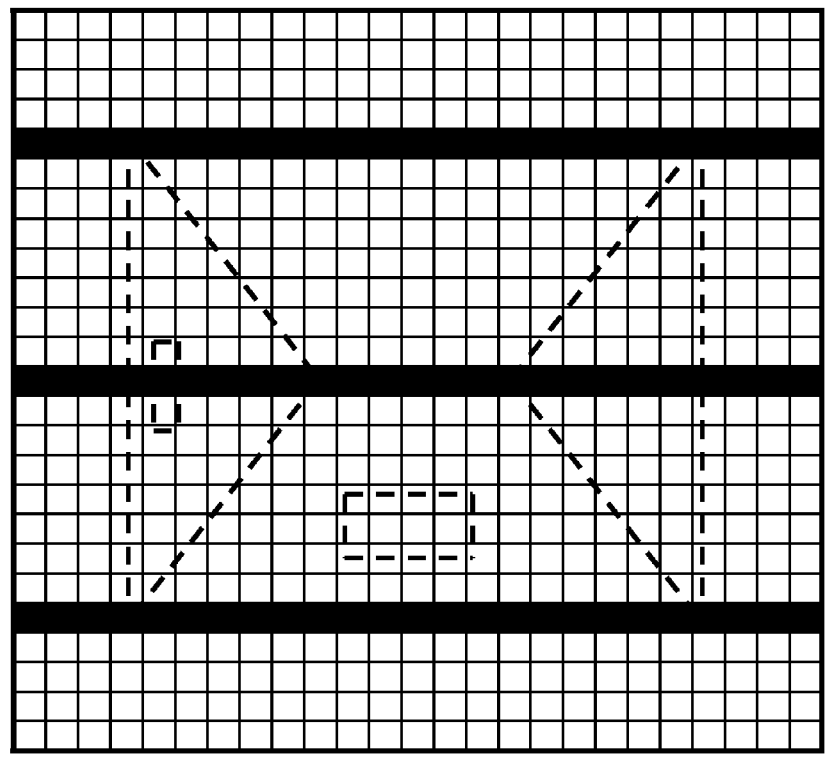
FIG. 21 illustrates grid lines extracted by the geospatial information creating system according to the embodiment of this invention.

Thereafter, based on the SLSs perpendicular to the house orientation, grid lines in the orthogonal direction illustrated in FIG. 19 are extracted, and, based on the SLSs parallel with the house orientation, grid lines in the parallel direction illustrated in FIG. 21 are extracted (S361).

Figure 22:
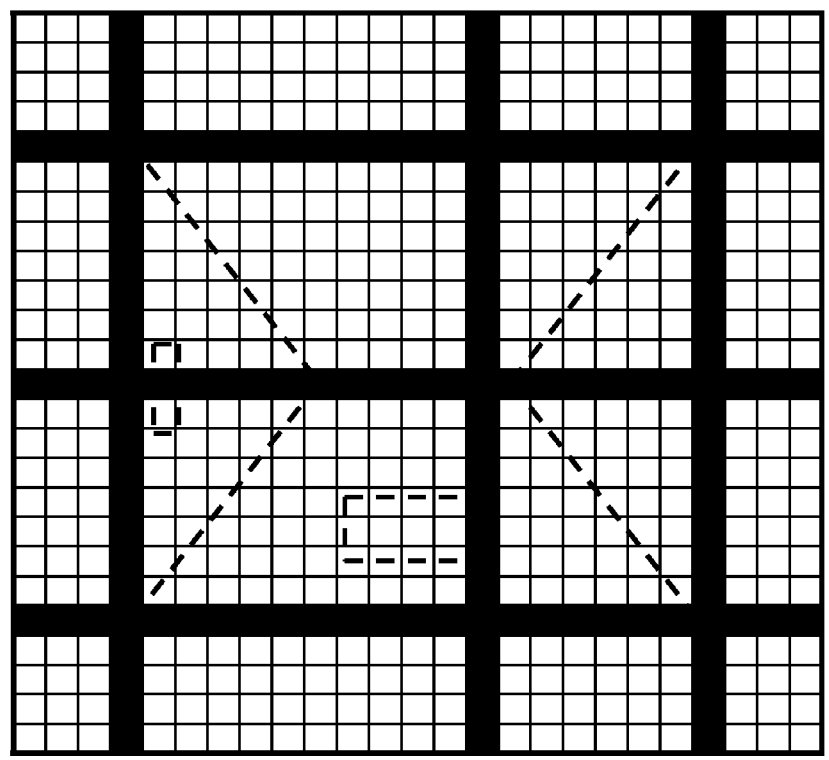
FIG. 22 illustrates a house area partitioned into grids with the grid lines in the geospatial information creating system according to the embodiment of this invention.

Thereafter, as illustrated in FIG. 22, the house area is partitioned by grids generated by using the extracted grid lines.

Figure 23:
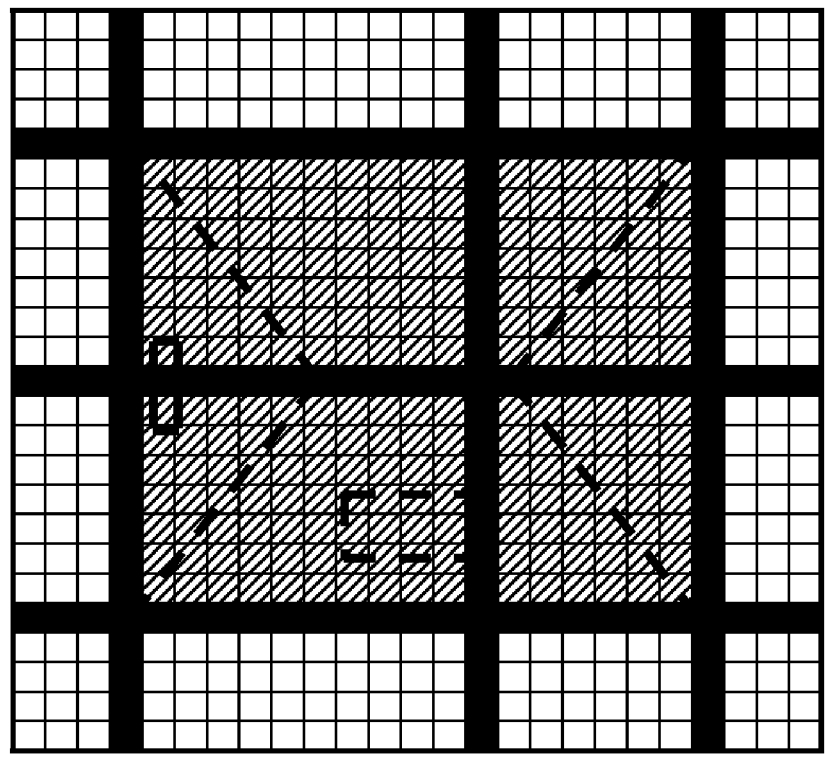
FIG. 23 illustrates a rooftop area of the house generated by merging grid cells in the geospatial information creating system according to the embodiment of this invention.
Figure 24:
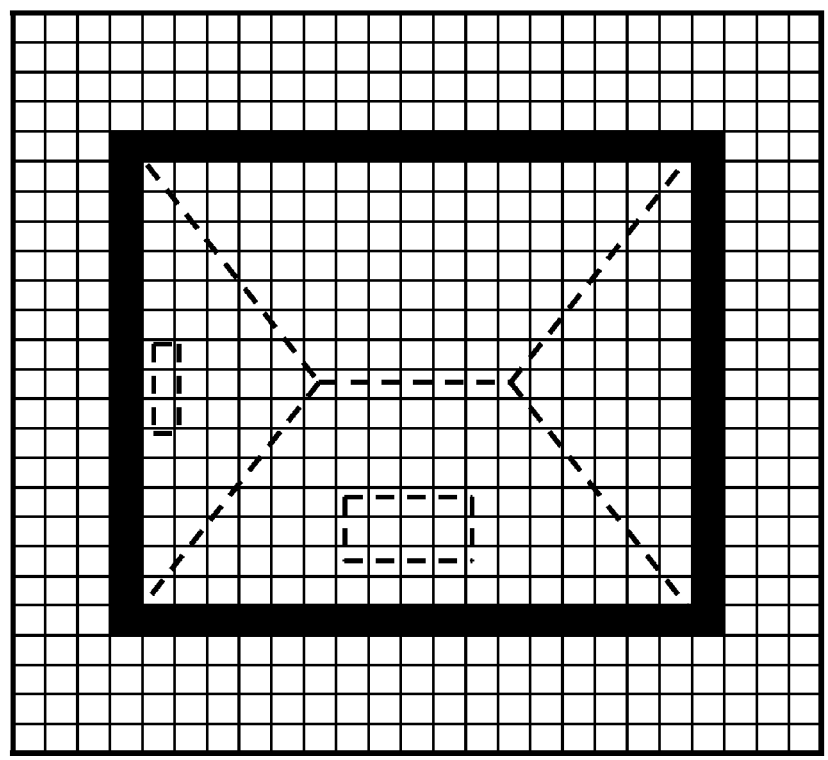
FIG. 24 illustrates a polygon in a shape of a house footprint generated by the geospatial information creating system according to the embodiment of this invention.

In FIG. 23, similar grid cells are merged into a rooftop area of the house (S41 and S42), and a polygon patch surrounded by the boundary extracted from the generated rooftop area (FIG. 24) is saved as a house footprint in the database (S51).

FIGS. 25A to 25G are images for describing extraction of a house footprint from a real image.

Figure 25A:
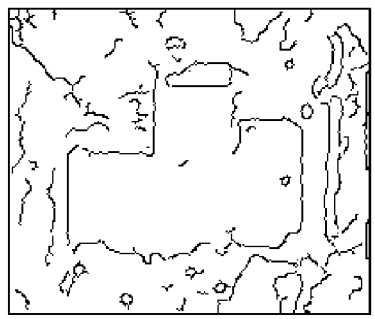
FIGS. 25A to 25H are images for describing a step of the house footprint extraction according to the embodiment of this invention.

Image edges are extracted from the house area (ROI) carved out from an aerial image (S31, FIG. 25A). Thereafter, the extracted image edges are fitted to SLSs (S32, FIG. 25B). The extracted SLSs are clustered into SLSs parallel with the house orientation, and SLSs perpendicular to the house orientation (S35, FIGS. 25C and 25D).

Figure 25E:
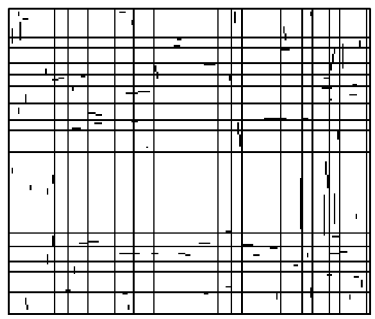
Figure 25B:
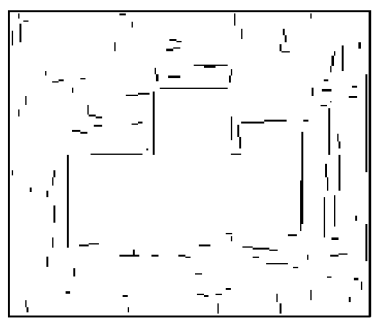
Figure 25F:
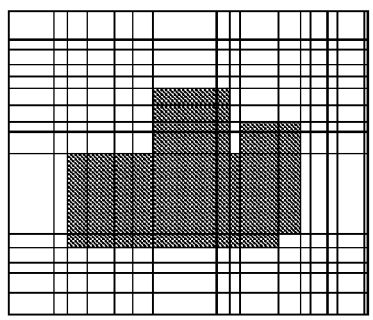
Figure 25C:
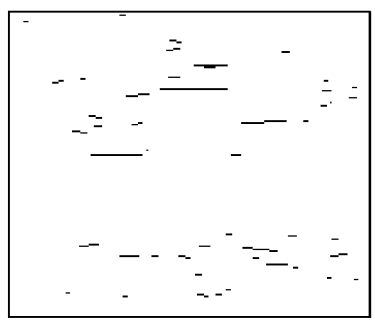
Figure 25G:
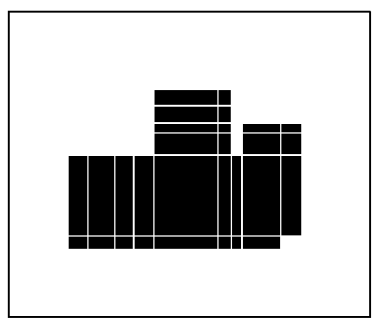
Figure 25D:
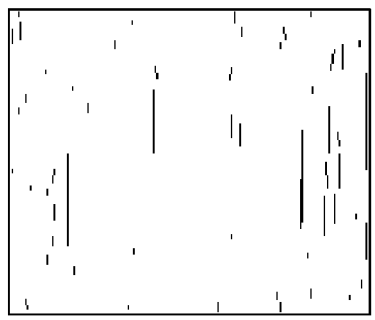
Figure 25H:
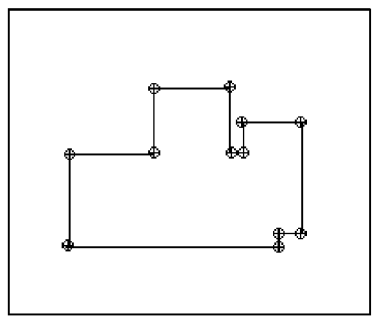

Thereafter, based on the SLSs clustered into two groups, grids are generated (S36, FIG. 25E). Next, similarity indices of the grid cells generated by the grids are calculated, and grid cells determined to be similar are marked (S41, FIG. 25F). Next, the grid cells determined to be similar are merged (S42, FIG. 25G), and a rectilinear polygon patch corresponding to a house footprint surrounded by outlines of the merged grid cells are generated (S51, FIG. 25H).

Figure 26:
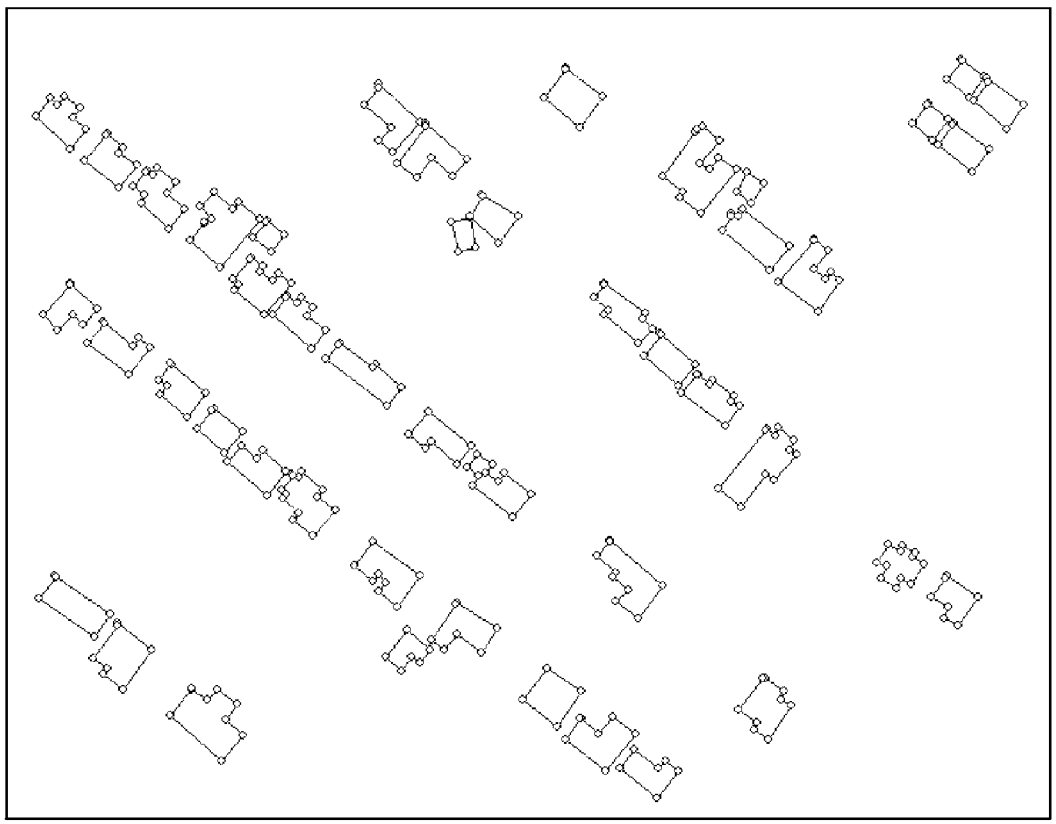
FIG. 26 illustrates house footprints extracted according to the embodiment of this invention.

In this way, by displaying the house footprints extracted in a plurality of house areas on one map, a house footprint map illustrated in FIG. 26 can be generated.

When a house footprint is extracted from an aerial photograph, edges of a house may be weak and occluded by other house footprints, and the house edges may thus be partially or totally invisible. In this case, for the conventional method (edge-linking method), the conditions such as edge direction, right angle etc. defined to guide link of edges appear weak and are insufficient to determine the correct edge candidates. Therefore, usually, a house footprint cannot be extracted in a portion in which edges of a house are invisible. On the other hand, region based methods normally fail to accurately locate the boundary of a house of interest. Specifically, the pixels of the house area do not extend to the edges of the image, and thus, there is no way to "pull" the house area for the edges of the image having occlusion.

The embodiment of this invention integrates the primitive features (such as edges and regions) into the rectilinear house model. Consequently, even for a complicated case such as a case of weak edges or occluded edges, a house geometric model and primitive features are properly matched. As a result, the embodiment of this invention can precisely extract a house footprint compared with the conventional technologies.

While the present invention has been described in detail and pictorially in the accompanying drawings, the present invention is not limited to such detail but covers various obvious modifications and equivalent arrangements, which fall within the purview of the appended claims.

What is claimed is:

1. A geospatial information creating system for extracting a footprint of a house from an aerial photograph, comprising a processor for executing a program, a memory for storing data required for executing the program, and a storage unit for storing the aerial photograph, wherein the processor is configured to:

detect edges of an image based on a characteristic quantity of neighboring pixels in the aerial photograph stored in the storage unit;

extract an orientation of the house by analyzing directions of the detected edges;

generate a polygon of an outline of the house by using linear lines of the extracted orientation of the house;

receive specification of a position by an operator for the house to extract the footprint;

determine a house area by an extent covered by extracted edges by periodically extracting neighboring pixels more similar than a threshold before extraction of the edges; and change the threshold by decreasing it, and extract again neighboring pixels more similar than the changed threshold in the case where the determined house area does not include the specified position.

2. The geospatial information creating system according to claim 1, wherein the processor is further configured to:

determine straight line segments to which the detected edges fit;

define the orientation of the house based on angles of the determined straight line segments;

classify the determined straight line segments into those in the defined orientation of the house and those in a direction orthogonal thereto;

generate grids at positions at which the classified straight line segments exist; and generate the polygon of the outline of the house according to the generated grids.

3. The geospatial information creating system according to claim 2, wherein the processor is further configured to:

calculate a color spectrum in each grid cell segmented by the generated grids, and calculate a similarity index of neighboring grid cells based on the calculated color spectrum; and merge grid cells having the calculated similarity index larger than a predetermined threshold to generate a rectilinear polygon patch corresponding to the footprint of the house surrounded by linear lines.

4. The geospatial information creating system according to claim 2, wherein the processor is further configured to:

determine a first frequency of a position of the determined straight line segments which is weighted by a length of the determined straight line segments, and generate a grid line constructing the grid at a position having the first frequency larger than a predetermined threshold; and calculate the first frequency so that the first frequency of a straight line segment close to the generated grid line is added to the first frequency of the generated grid line.

5. The geospatial information creating system according to claim 2, wherein the processor is further configured to determine a second frequency of the angle of the determined straight line segments which is weighted by a length of the determined straight line segments, and define an angle high in the second frequency as the orientation of the house.

6. A geospatial information creating method for extracting a footprint of a house from an aerial photograph, the method being carried out by a computer system including a processor for executing a program, a memory for storing data required for executing the program, and a storage unit for storing the aerial photograph, the method comprising:

detecting edges of an image based on a characteristic quantity of neighboring pixels in the aerial photograph stored in the storage unit;

extracting an orientation of the house by analyzing directions of the detected edges;

generating a polygon of an outline of the house by using linear lines of the extracted orientation of the house;

receiving specification of a position by an operator for the house to extract the footprint;

determining a house area by an extent covered by extracted edges by periodically extract neighboring pixels more similar than a threshold before extraction of the edges; and changing the threshold by decreasing it, and extracting again neighboring pixels more similar than the changed threshold in the case where the determined house area does not contain the specified position.

7. The geospatial information creating method according to claim 6, further comprising:

determining straight line segments to which the detected edges fit;

defining the orientation of the house based on angles of the determined straight line segments;

classifying the determined straight line segments into those in the defined orientation of the house, and those in a direction orthogonal thereto;

generating grids at positions at which the classified straight line segments exist; and generating the polygon of the outline of the house according to the generated grids.

8. The geospatial information creating method according to claim 7, further comprising:

calculating a color spectrum in each grid cell segmented by the generated grids, and calculating a similarity index of neighboring grid cells based on the calculated color spectrum; and merging grid cells having the calculated similarity index larger than a predetermined threshold to generate a rectilinear polygon patch corresponding to the footprint of the house surrounded by linear lines.

9. The geospatial information creating method according to claim 7, further comprising:

determining a first frequency of a position of the determined straight line segments which is weighted by a length of the determined straight line segments, and generating a grid line constructing the grid at a position having the first frequency larger than a predetermined threshold; and calculating the first frequency so that the first frequency of a straight line segment close to the generated grid line is added to the first frequency of the generated grid line.

10. The geospatial information creating method according to claim 7, further comprising:

determining a second frequency of the angle of the determined straight line segments which is weighted by a length of the determined straight line segments, and defining an angle high in the second frequency as the orientation of the house.

* * * * *